(12) United States Patent
Schyttberg (10) Patent No.: US 9,752,720 B2
(45) Date of Patent: Sep. 5, 2017

(54) SUPER LIGHTWEIGHT HOLDING FIXTURE

(71) Applicant: Chongqing Holje Precision Machinery Co., Ltd., Chongqing (CN)

(72) Inventor: Chrisolof Schyttberg, Olofstrom (SE)

(73) Assignee: Chongqing Holje Precision Machinery Co., Ltd., Chongqing (CN)

( * ) Notice: Subject to any disclaimer, the term of this patent is extended or adjusted under 35 U.S.C. 154(b) by 0 days.

(21) Appl. No.: 15/041,787

(22) Filed: Feb. 11, 2016

(65) Prior Publication Data
US 2016/0238190 A1    Aug. 18, 2016

(30) Foreign Application Priority Data

Feb. 13, 2015    (CN) .................... 2015 2 0103212 U (51) Int. Cl.
| | |
|---|---|
| *F16M 11/38* | (2006.01) |
| *F16M 11/22* | (2006.01) |
| *F16M 11/04* | (2006.01) |
| *F16M 11/14* | (2006.01) |
| *F16M 11/20* | (2006.01) |
| *G01B 5/00* | (2006.01) |

(52) U.S. Cl.
CPC ............. *F16M 11/22* (2013.01); *F16M 11/04* (2013.01); *F16M 11/14* (2013.01); *F16M 11/2078* (2013.01); *G01B 5/0004* (2013.01)

(58) Field of Classification Search
CPC ........ F16M 11/22; F16M 11/04; F16M 11/14; F16M 11/2078; G01B 5/0004
USPC ................. 248/129, 436; 211/182, 195, 201; 52/280, 655.1, 656.9; 403/171
See application file for complete search history.

(56) References Cited

U.S. PATENT DOCUMENTS

| | | | | |
|---|---|---|---|---|
| 2,483,263 A | * | 9/1949 | Cummings | ............ A47B 43/00 211/130.1 |
| D264,694 S | * | 6/1982 | Takahashi | ................... 428/542.2 |
| 4,676,043 A | * | 6/1987 | Grimm | ................. E04B 1/1903 403/171 |

(Continued)

OTHER PUBLICATIONS

TetraFix Type Bound Fixtures Sales Catalogue, May 6, 2014.†
Magazine Verkstäderna, Cover Page and p. 15, Apr. 20, 2009.†

*Primary Examiner* — Gwendolyn Baxter
(74) *Attorney, Agent, or Firm* — Reinhart Boerner Van Deuren P.C.

(57) ABSTRACT

An ultra lightweight clamp for three coordinate measuring comprises a support assembly and locating-clamping devices mounted on the support assembly, the support assembly comprising joints and supporting bars, opposite ends of each supporting bar being inserted into a corresponding joint, each locating-clamping device being mounted on several first level joints arranged at the top of the support assembly, the first level joints being each carried by at least three oblique first supporting bars to form a first layer of pyramid-like spatial frameworks, and the first supporting bars each having an lower end inserted into a corresponding second level joint. On the basis of the height of the clamp, the support assembly comprises one or more layers of pyramid-like spatial frameworks, and the joints at the lower end of the bottom layer of pyramid-like spatial frameworks are coupled with feet to be connected to a measuring platform.

13 Claims, 6 Drawing Sheets

(56) References Cited

U.S. PATENT DOCUMENTS

| | | | | |
|---|---|---|---|---|
| 6,672,789 B2 * | 1/2004 | Chen | ................... | F16B 7/185 |
| | | | | 403/171 |
| 6,799,594 B2 * | 10/2004 | Kuo | ................... | E04H 12/10 |
| | | | | 135/120.3 |
| D505,030 S * | 5/2005 | Heath | ................... | D6/403 |
| 7,296,699 B2 * | 11/2007 | Hung | ................... | A47B 47/005 |
| | | | | 211/182 |
| 2004/0194411 A1 † | 10/2004 | Olsson | | |

\* cited by examiner
† cited by third party

SUPER LIGHTWEIGHT HOLDING FIXTURE

CROSS-REFERENCE TO RELATED PATENT APPLICATIONS

This patent application claims the benefit of Chinese Application No. 201520103212.2, filed on Feb. 13, 2015, the entire teachings and disclosure of which are incorporated herein by reference thereto.

TECHNICAL FIELD

The invention relates to a clamp for measuring, and in particular to an ultra lightweight clamp for three coordinate measuring.

BACKGROUND ART

A three coordinate measuring machine is a measuring system which measures three dimensional coordinates of surface points on a workpiece through relative movement between a probe system and the workpiece. An object to be measured is located in the measuring space of the three coordinate measuring machine, and position coordinates of measuring points on the object to be measured are obtained by a contact or non-contact detection system. Deviations between real contour values and theoretical contour values of the object to be measured are derived by mathematical comparison of spatial coordinate values of these points using a software, so the object can be determined as whether it meets precision requirements. Vehicle components and parts have characteristics like high quality requirement, large amount and variance in shape, so an ideal solution for conducting geometrical measurement and quality control of various vehicle components and parts is using a three coordinate measuring machine. For example, for various single pieces of sheet metal, welded pieces, assemblies or other vehicle components and parts, a particular vehicle component or part shall be fixedly located on a clamp, and the clamp in turn is located relative to a platform of the measuring machine, so the vehicle component or part in measuring machine can be measured to determine the spatial position of it. For the reason that the vehicle components and parts to be measured are generally relatively big and heavy, the clamp has also a relative large size and weight to meet the requirement on supporting strength. A conventional clamp for three coordinate measuring generally comprises a support assembly and locating-clamping devices. The locating-clamping devices are configured for clamping and locating a component or part to be measured. The locating-clamping devices are fixedly supported by the support assembly, and the support assembly is formed by a process which involves welding pieces of carbon steel or assembling profiles of aluminum alloy. The support assembly has a rectangular frame structure, or is formed by fixing several vertical supporting plates onto a base plate. This type of conventional clamp for measuring is very bulky, which results in inconvenience in transportation, waste in material in manufacturing and low reusage rate. In the condition that profiles of aluminum alloy are used, although the weight can be lowered down, the rectangular frame is still relative bulky. In addition, the effect of temperature on dimensions should be considered in manufacturing since coefficient of linear expansion of profiles of aluminum alloy is high.

SUMMARY OF THE INVENTION

In view of the above problems found in prior art, the invention is aimed at providing an ultra lightweight clamp for three coordinate measuring which is light weighted, is convenient in use and transport, can save manufacturing material and resources, and is detachable and reassemble to provide a high reusage rate.

According to a technical solution of the invention, an ultra lightweight clamp for three coordinate measuring comprises a support assembly and locating-clamping devices mounted on the support assembly, the support assembly comprising joints and supporting bars, the joints connecting the supporting bars together, with opposite ends of each supporting bar being inserted into a corresponding joint, each locating-clamping device being mounted on several first level joints arranged at the top of the support assembly, the first level joints being each carried by at least three oblique first supporting bars to form a first layer of pyramid-like spatial frameworks, the first supporting bars each having an lower end inserted into a corresponding second level joint, and the second level joints being arranged at the same level and connected together by horizontal supporting bars; wherein, on the basis of the height of the clamp, the support assembly comprises one or more layers of pyramid-like spatial frameworks, and the joints at the lower end of the bottom layer of pyramid-like spatial frameworks are coupled with feet which are configured to be located on and connected to a measuring platform.

Further, in order that required height and proper supporting strength can be obtained and meanwhile lightweighting of the clamp can be guaranteed, the support assembly comprises two layers of pyramid-like spatial frameworks, in which a second layer of pyramid-like spatial frameworks is formed by second level joints, second supporting bars, third level joints and horizontal supporting bars connecting the third level joint together.

Further, each of the joints is spherical, with the top of each first level joint being planar, and the supporting bars comprise carbon fiber tubes. By using spherical joints, supporting bars in various oblique angles can be supported. Each supporting bar comprises a connection segment connected with the joint, the axis of the connection segment passing through the center of the sphere of the joint. In this way, the joint is subjected to well distributed forces and provides a higher supporting strength. In addition, the axes of connection holes in the joint also pass through the center of the sphere of the joint, so the connection holes are normal to the outer surface of the joint, which facilitates the machining of them. The supporting bars are in the form of carbon fiber tubes, which further contributes the lightweighting of the support assembly. Carbon fiber tubes have advantages like high strength, long service life, high corrosion resistance, light weight and low density. In addition, carbon fiber tubes are suitable materials for manufacturing the support assembly for measuring since the effect of temperature on dimensions of them is small during manufacturing because carbon fiber tubes have a small coefficient of thermal expansion and thus stable dimensions.

Further, for facilitating manufacturing and for simplifying the structure to a maximum extent, each of the joints is formed by two partial-spherical hollow casings, the supporting bars comprise non-swingable supporting bars, opposite ends of each non-swingable supporting bar are each provided with a connection sleeve with an internal screw thread, and a screw is engaged into the connection sleeve through the partial-spherical casing from the inside of the partial-spherical casing to connect the joint with the supporting bar.

Further, in order to avoid interference between ends of neighboring supporting bars, the connection sleeve of the non-swingable supporting bar may be in the form of a conical sleeve, with the diameter of the connection sleeve becoming smaller towards the end of connection sleeve which is adjacent to the joint. In this way, interference can be avoided. Of course, when there is enough mounting space, it is recommended that the connection sleeve is in the form of a cylindrical sleeve so that the frame can have a maximum strength to guarantee its stability.

Further, for facilitating manufacturing and for simplifying the structure to a maximum extent, each of the joints is formed by two partial-spherical hollow casings, the supporting bars further comprise swingable supporting bars, and opposite ends of each swingable supporting bar are each provided with a connection sleeve with an internal screw thread, with one or both ends of the swingable supporting bar being connected with corresponding joints via swingable couplers; wherein each swingable coupler comprises a pair of socket part and ball head which are mating with each other, and opposite ends of the swingable coupler are provided respectively with a screw bar engaged with the connection sleeve and a screw hole engaged with a screw which extends out from the joint. Each swingable supporting bar is adjustable within a certain range of angle to avoid interference between ends of neighboring supporting bars. In addition, restriction conditions in design of the whole frame can be reduced, while all the supporting bars in various oblique angles can be inserted into the joint which has a limited outer diameter. In addition, the connection holes of the joint are all oriented in radial directions, so it is easy to form the connection holes and the joint has a good force carrying ability.

Further, for facilitating manufacturing and assembling, the socket part is formed by assembling a socket bar, a connection seat and an outer sleeve in sequence, the socket bar is formed with an outer screw thread to form the screw bar, a screw nut is engaged around the screw bar, the connection seat and the outer sleeve are adjoined with each other to form an internal spherical surface therein for accommodating the ball head, and an end of the ball head is provided with a base in which a screw hole is formed.

Further, the partial-spherical casings comprise a larger one and a smaller one, the interfacing portions of the two partial-spherical casings are formed with teeth and slots which are engaged with each other, the supporting bars are mounted to the bigger partial-spherical casing, and the smaller partial-spherical casing is fixedly connected with the bigger partial-spherical casing by a screw.

Further, in order that proper supporting strength can be obtained and meanwhile lightweighting of the clamp can be guaranteed, the support assembly comprises one or two layers of pyramid-like spatial frameworks, and the supporting bars each have a diameter of 15-25 mm.

Further, the feet and the joints are all formed of aluminum alloy, the feet comprise at least three feet, each foot is located at the bottom of a corresponding joint by means of a pin and fixed thereto by a screw, the support assembly comprises roller wheels at a longitudinal end of it, the roller wheels are mounted respectively to corresponding joints on opposite sides of the end of the support assembly, the roller wheels are on the outside of the feet in the longitudinal direction of the support assembly, and the bottom edges of the roller wheels are higher than the bottom surfaces of the feet in the height direction of support assembly.

According to the invention, the locating-clamping devices are supported by pyramid-like spatial frameworks, with opposite ends of each supporting bar being inserted in a corresponding joint, and the supporting bars are connected by the joint to form the support assembly. A stable triangular frame is formed by each set of three neighboring joints, and, by means of the weight carrying joints, pyramidal spatial frameworks are formed, each comprising several such triangular frames. Compared with the rectangular framework according to prior art, the support assembly of the invention provides a structure which is more stable and has a higher support strength, and thanks for this configuration, the supporting bars may be formed by hollow tubes having relatively small diameter, so the support assembly is lightweighted and the material for forming them can be reduced. In addition, when carbon fiber tubes are used for forming the supporting bars, the clamp may be ultra lightweighted, and is convenient to use and transport. Further, only by adding or reducing the total number of the joints and replacing some oblique supporting bars, the clamp can be constructed in a new configuration. Most supporting bars for forming the support assembly can be reusable, so the reusage rate is high and resources can be saved. Further, when the clamp will not be used temporarily, it can be detached and thus occupies a smaller storage space.

By means of above solutions, the invention provides the following advantages: lightweighted, easy to manufacture and transport, dimensionally stable, saving manufacturing material and resources, and being detachable and reassemble so that components of the support assembly have a high reusage rate.

DETAILED DESCRIPTION OF PREFERRED EMBODIMENTS

Now some preferred embodiments of the invention will be described in details with reference to the drawings.

As shown in FIG. 1 to FIG. 4, an ultra lightweight clamp for three coordinate measuring of the invention comprises a support assembly 100 and locating-clamping devices 200 mounted to the support assembly 100. The locating-clamping devices 200 are configured for locating and clamping a part to be measured. The support assembly 100 comprises joints 1 and supporting bars 2. The supporting bars 2 are connected together by the joints 1. Opposite ends of each supporting bar 2 are inserted into corresponding joints 1, so the supporting bars 2 are connected together to form the support assembly 100 by the joints 1. A stable triangular frame is formed by each set of three neighboring joints 1, and, by means of the weight carrying joints 1, pyramidal spatial frameworks are formed, each comprising several such triangular frames. In the illustrated embodiment, each joint 1 is spherical, and each supporting bar 2 is a carbon fiber tube. By using the spherical joints 1, the supporting bars 2 can be supported in various oblique angles. Each supporting bar 2 comprises a connection segment connected with the joint 1, the axis of the connection segment passing through the center of the sphere of the joint 1. In this way, the joint 1 is subjected to well distributed forces and provides a higher supporting strength. In addition, the axes of connection holes in the joint 1, which correspond to the connection segments, also pass through the center of the sphere of the joint 1, so the connection holes are normal to the outer surface of the joint 1, which facilitates the machining of them. The supporting bars 2 are in the form of carbon fiber tubes, which further contributes the lightweighting of the support assembly 100. Carbon fiber tubes have advantages like high strength, long service life, high corrosion resistance, light weight and low density. In addition, carbon fiber tubes are suitable materials for manufacturing the support assembly 100 for measuring since the effect of temperature on dimensions of them is small during manufacturing because carbon fiber tubes have a small coefficient of thermal expansion and thus stable dimensions. In the present embodiment, the carbon fiber tubes each have an outer diameter of 20 mm.

The positions and total number of the locating-clamping devices 200 are decided in accordance with the locating point and the clamping points of the part to be measured. The locating-clamping devices 200 have a conventional structure used in prior art and is not described further here. The locating-clamping devices 200 are each mounted to several first level joints 11 which are arranged at the top of the support assembly 100. The first level joints 11, each supported by upper ends of at least three oblique first supporting bars 21, form a first layer of pyramid-like spatial frameworks. The lower ends of the first supporting bar 21 are inserted into corresponding second level joints 12. The second level joints 12 are arranged at the same level and are connected together by horizontal supporting bars 23. The horizontal supporting bar 23 connect the second level joints 12 in serial to form a horizontal framework. Depending on the height of the clamp, the support assembly 100 comprises one or more layers of pyramid-like spatial frameworks. The joints 1 at the lower end of the bottom layer of pyramid-like spatial frameworks are coupled with feet 3 which are configured to be located on and connected to a measuring platform. The feet 3 and the joints 1 are all formed of aluminum alloy so that they have reduced weight and high strength.

Figure 8:
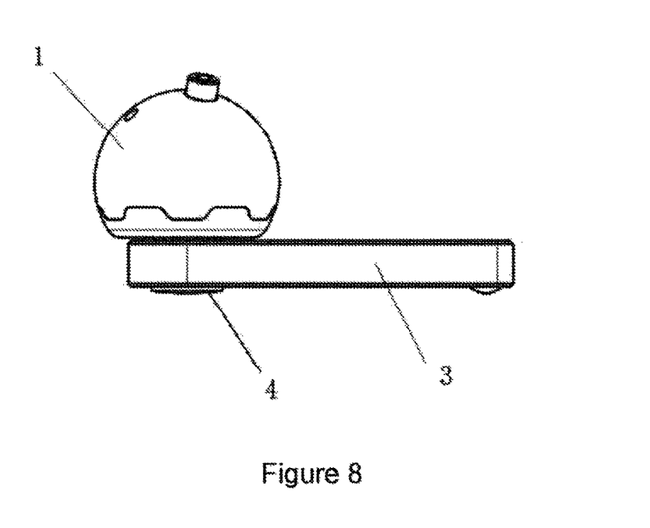
FIG. 8 is a front view of a foot in the structure shown in FIG. 1.

In the present embodiment, preferably, the joints 1 are spherical and the support assembly 100 comprises two layers of pyramid-like spatial frameworks, in which the second layer of pyramid-like spatial frameworks is form by the second level joints 12, second supporting bars 22, third level joints 13 and the horizontal supporting bars 23 connected to the third level joints 13, so that required height and proper supporting strength can be obtained, and meanwhile lightweighting of the clamp can be guaranteed. The feet 3 are coupled to corresponding third level joints 13, and in the present embodiment there are three feet 3. The feet 3 may each be in the form of a rectangular block through which a mounting and locating hole is formed for connecting it to the measuring platform, as shown in FIG. 8. Each foot 3 is located at the bottom of a corresponding joint 1 by means of a pin, and is then fixedly connected to the joint 1 by a first screw 4. Contacting surfaces between the joint 1 and the foot 3 are planar. The support assembly 100 comprises roller wheels 5 at a longitudinal end of it. The two roller wheels 5 are mounted respectively to the joints 1 on opposite sides of the end of the support assembly 100. The roller wheels 5 are on the outside of the feet 3 in the longitudinal direction of the support assembly 100. The bottom edges of the roller wheels 5 are higher than the bottom surfaces of the feet 3 in the height direction of support assembly 100. In the state that the clamp is arranged on the measuring platform of the three coordinate measuring machine, the roller wheel 5 is suspended over the measuring platform. When the clamp is to be moved, the other longitudinal end, which does not have any roller wheel 5, can be lifted up, so the clamp can be pulled to move with the roller wheels 5 as supporting points of the clamp. In this manner, the clamp can be used and adjusted more conveniently.

As shown in FIG. 1 to FIG. 6, in the present embodiment, preferably, the joints 1 are spherical, and the top of each first level joint 11 is planar to facilitate the connection between it and the locating-clamping device 200. For facilitating the manufacturing and for simplifying the structure to a maximum extent, each joint 1 is formed by two partial-spherical hollow casings assembled together, one being larger while the other being smaller. The interfacing portions of the two partial-spherical casings are formed with teeth and slots which are engaged with each other. The supporting bars 2 are mounted to the bigger partial-spherical casing 14, and for this purpose the bigger partial-spherical casing 14 has a higher structural strength. The smaller partial-spherical casing 15 is mainly used for closing the sphere and enclosing a complete internal cavity with the bigger partial-spherical casing 14, to increase the structural strength of the whole sphere. The smaller partial-spherical casing 15 is formed with a screw hole for connecting the smaller partial-spherical casing 15 fixedly to the bigger partial-spherical casing 14 by a second screw 6.

Figure 1:
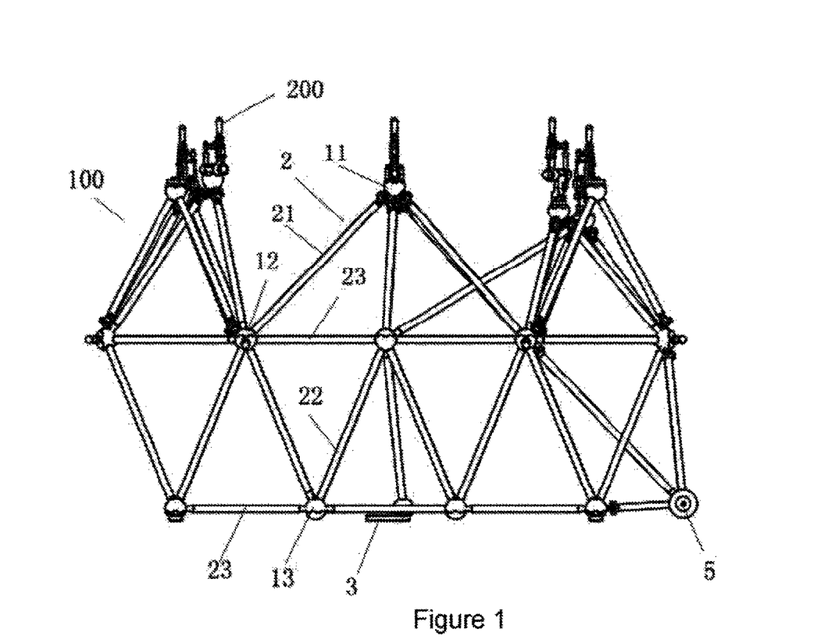
FIG. 1 is a schematic view of a structure of the invention.
Figure 2:
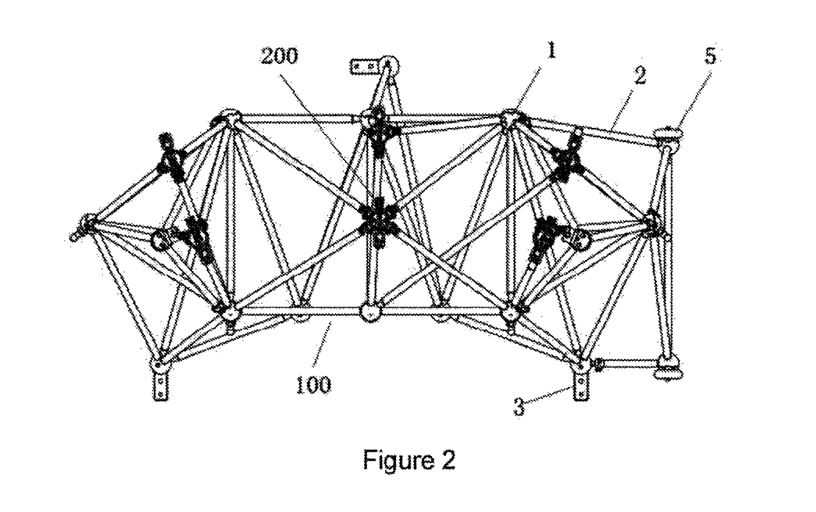
FIG. 2 is a top view of the structure shown in FIG. 1.
Figure 3:
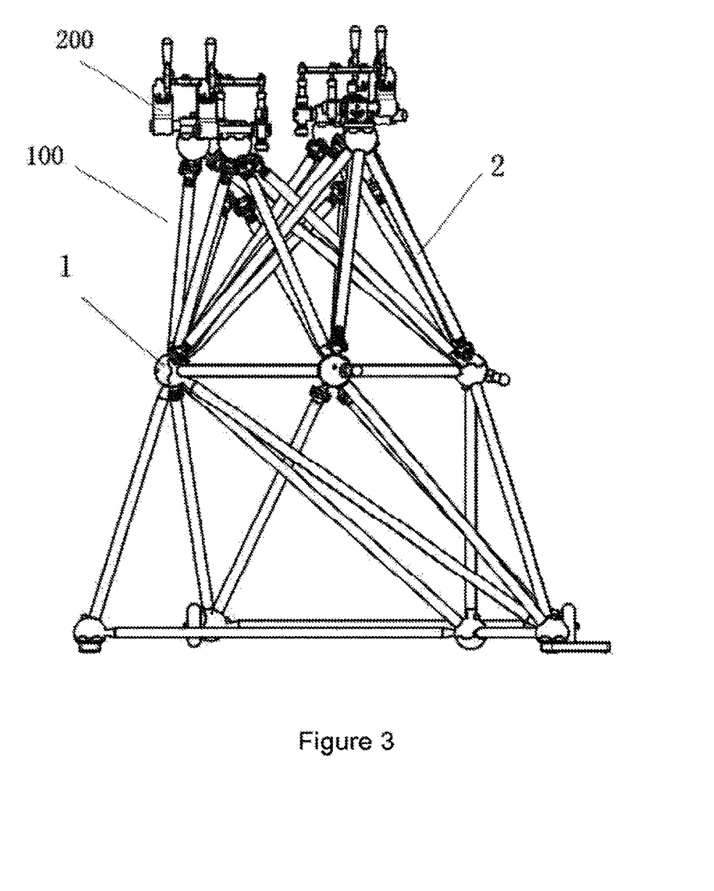
FIG. 3 is a left side view of the structure shown in FIG. 1.
Figure 4:
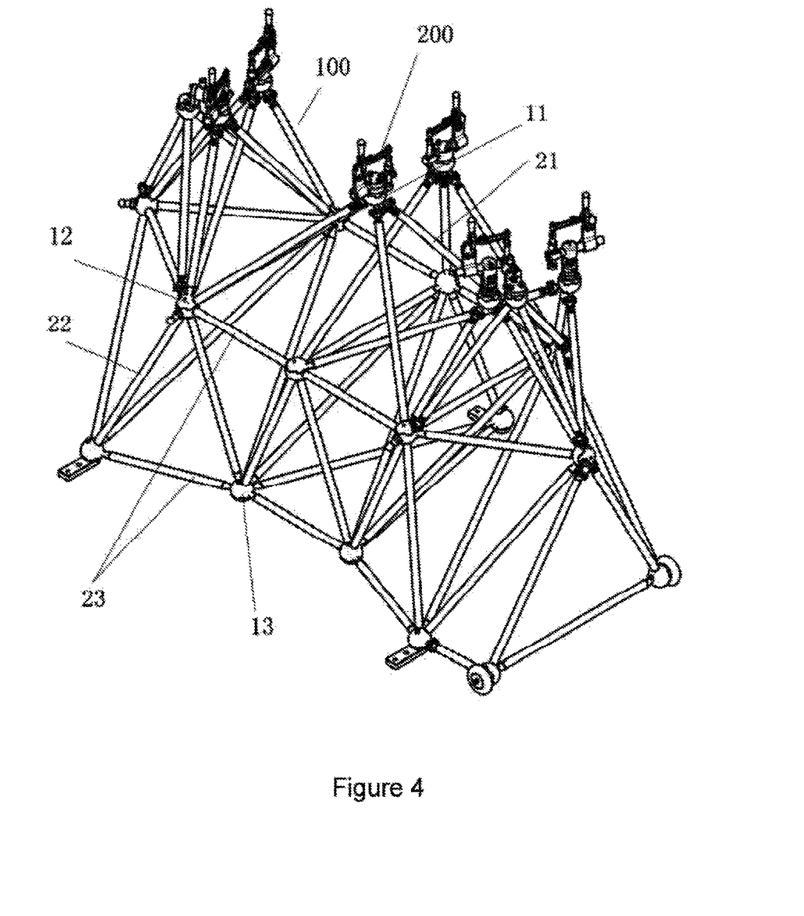
FIG. 4 is a schematic perspective view of the structure of the invention.
Figure 5:
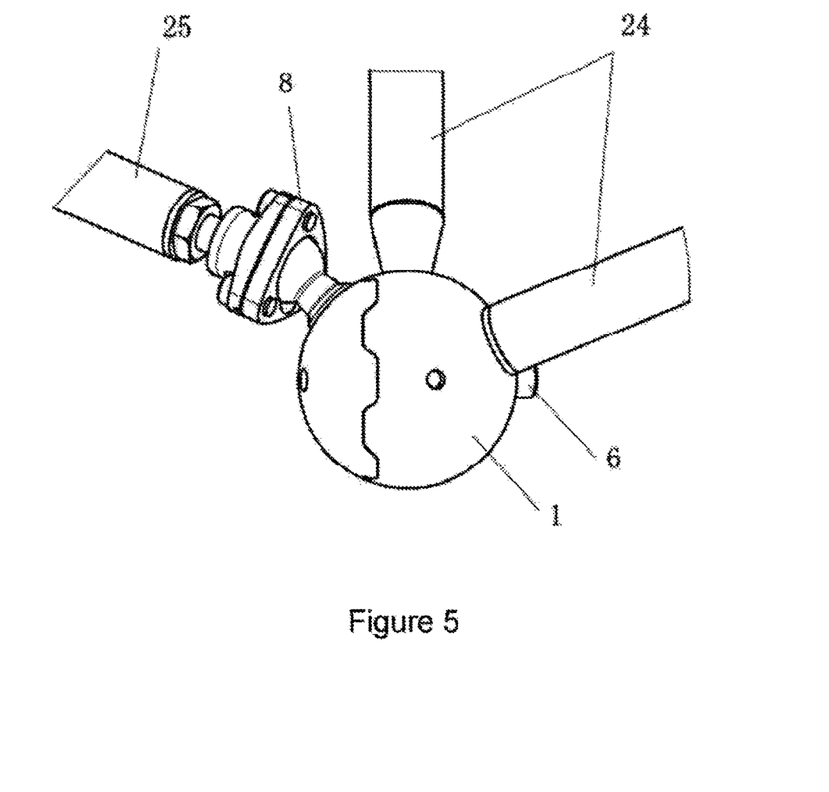
FIG. 5 is a schematic view of a joint and supporting bars connected to it in a support assembly in the structure of the invention.
Figure 6:
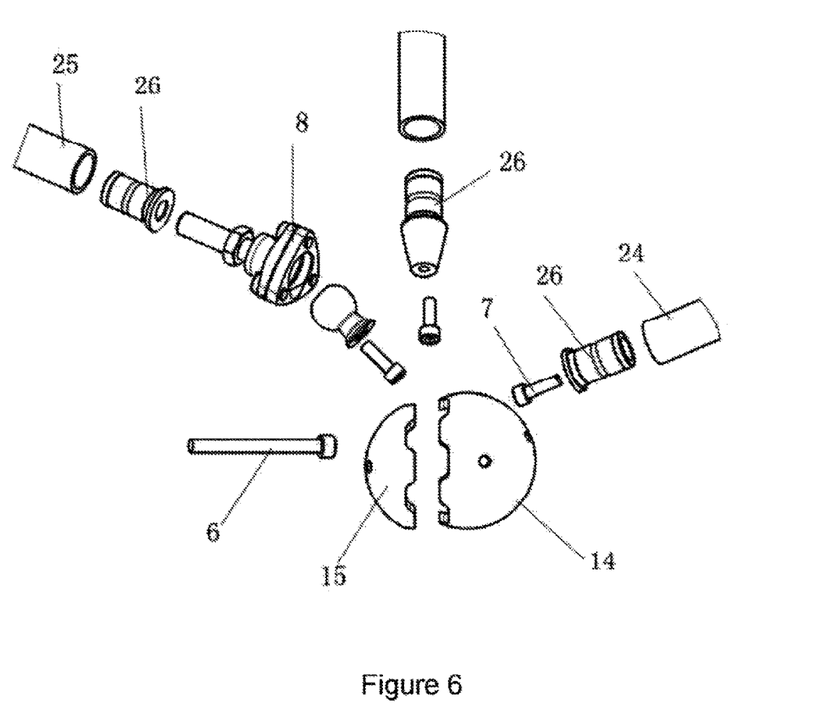
FIG. 6 is a schematic view of the structure shown in FIG. 5 in a disassembled state.

The supporting bars 2 are categorized into non-swingable supporting bars 24 and swingable supporting bars 25. Opposite ends of each non-swingable supporting bar 24 are each provided with a connection sleeve 26 with an internal screw thread. The connection sleeve 26 may be in the form of a cylindrical sleeve or a conical sleeve. A third screw 7 is screwed into the connection sleeve 26 through the corresponding partial-spherical casing from the inside of the partial-spherical casing to connect the joint 1 with the supporting bar 2. In order to avoid interference between the ends of the supporting bars 2, the connection sleeve 26 of each non-swingable supporting bar 24 can be formed as a conical sleeve so that the diameter of the connection sleeve 26 becomes smaller towards the end of the connection sleeve 26 which is adjacent to the joint 1. In the case that the root portions of the supporting bars 2 in the joint 1 may potentially interfere with each other, the interference can be avoided by forming the ends of the non-swingable supporting bar 24 to be conical. Thus, a compact structure can be obtained since the outer diameter of the joint 1 does not need to be designed to be unnecessarily large. Of course, when there is enough mounting space, it is recommended that the connection sleeve 26 is in the form of a cylindrical sleeve so that the frame can have a maximum strength to guarantee its stability.

Figure 7:
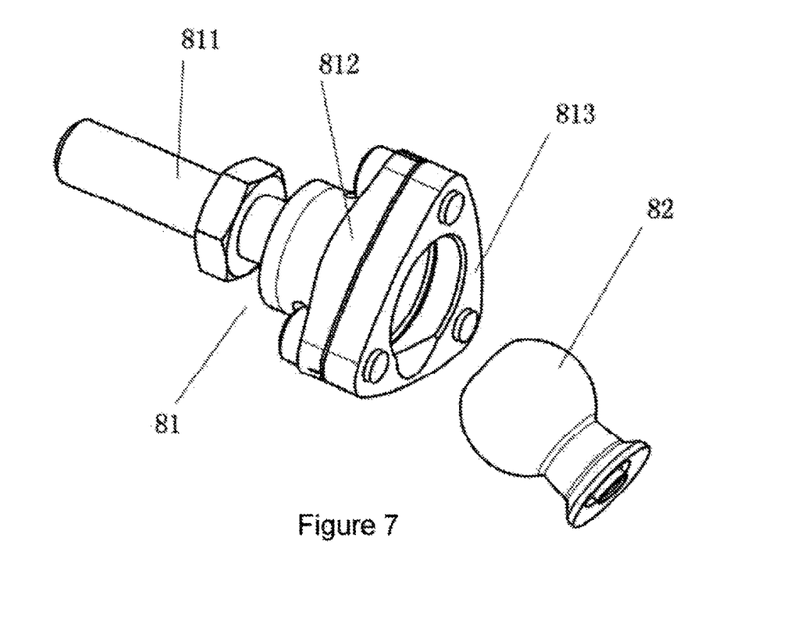
FIG. 7 is a schematic view of a swingable coupler in the structure shown in FIG. 6.

As shown in FIG. 6 and FIG. 7, the swingable supporting bar 25 is equipped with the internally threaded connection sleeve 26 at each of its opposite ends. One or both ends of the swingable supporting bar 25 are respectively coupled with the joint 1 via a swingable coupler 8. The swingable coupler 8 comprises a pair of socket part 81 and ball head 82 which are mating with each other. Opposite ends of the swingable coupler 8 are formed respectively with a screw bar for engaging with the connection sleeve 26 and a screw hole to be engaged with the third screw 7 which extends out from the joint 1. By using the swingable supporting bars 25, interference between the ends of the supporting bars 2 can be avoided. There is no limitation to the oblique angles of the supporting bars 2, only if all the supporting bars 2 in various oblique angles can be inserted into the joint 1 which has a limited outer diameter. In addition, the connection holes of the joint 1 are all oriented in radial directions so that their axes pass through the center of the sphere of the joint 1, so it is easy to form the connection holes and the joint 1 has a good force carrying ability. For facilitating manufacturing and assembling, the socket part 81 is formed in a process of assembling a socket bar 811, a connection seat 812 and an outer sleeve 813 in sequence. The socket bar 811 is formed with an outer screw thread to form the screw bar, and a screw nut engages around the screw bar. The screw bar is connected with the connection sleeve 26 on the supporting bar 2. The connection seat 812 and the outer sleeve 813 are adjoined with each other to form an internal spherical surface therein for accommodating the ball head 82. An end of the ball head 82 is provided with a base in which a screw hole is formed. The screw hole in the base is engaged by the third screw 7 which extends out from the joint 1, so that the swingable coupler 8 connects the supporting bar 2 with the joint 1.

The support assembly 100 of the invention provides a structure which is more stable and has higher support strength, and thanks to this configuration, the supporting bars 2 may be formed by hollow tubes having relatively small diameter, so the support assembly 100 is lightweighted and the material for forming them can be reduced. In addition, carbon fiber tubes are used for forming the supporting bars 2, which renders the clamp ultra lightweight, and convenient to use and transport. Further, the clamp is detachable and able to be reassembled, so the reusage rate of the components of the support assembly 100 is high.

While certain embodiments of the invention have been described, these embodiments have been presented by way of example only, and are not intended to limit the scope of the invention. The attached claims and their equivalents are intended to cover all the modifications, substitutions and changes as would fall within the scope and spirit of the invention.

The invention claimed is:

1. An ultra lightweight clamp for three coordinate measuring comprising a support assembly and locating-clamping devices mounted on the support assembly, the support assembly comprising joints and supporting bars, the joints connecting the supporting bars together, with opposite ends of each supporting bar being inserted into a corresponding joint, each locating-clamping device being mounted on several first level joints arranged at the top of the support assembly, the first level joints being each carried by at least three oblique first supporting bars to form a first layer of pyramidal spatial frameworks, the first supporting bars each having an lower end inserted into a corresponding second level joint, and the second level joints being arranged at the same level and connected together by horizontal supporting bars; wherein, on the basis of the height of the clamp, the support assembly comprises one or more layers of said pyramidal spatial frameworks, and the joints at the lower end of the bottom layer of said pyramidal spatial frameworks are coupled with feet which are configured to be located on and connected to a measuring platform.

2. The ultra lightweight clamp for three coordinate measuring of claim 1, wherein the support assembly comprises two layers of said pyramidal spatial frameworks, in which a second layer of said pyramidal spatial frameworks is formed by second level joints, second supporting bars, third level joints and horizontal supporting bars connecting the third level joint together.

3. The ultra lightweight clamp for three coordinate measuring of claim 1, wherein each of the joints is spherical, with the top of each first level joint being planar, and the supporting bars comprise carbon fiber tubes.

4. The ultra lightweight clamp for three coordinate measuring of claim 3, wherein each of the joints is formed by two partial-spherical hollow casings, the supporting bars comprise non-swingable supporting bars, opposite ends of each non-swingable supporting bar are each provided with a connection sleeve with an internal screw thread, and a screw is engaged into the connection sleeve through the partial-spherical casing from the inside of the partial-spherical casing to connect the joint with the supporting bar.

5. The ultra lightweight clamp for three coordinate measuring of claim 4, wherein the connection sleeve of the non-swingable supporting bar is in the form of a conical sleeve, with the diameter of the connection sleeve becoming smaller towards the end of connection sleeve which is adjacent to the joint.

6. The ultra lightweight clamp for three coordinate measuring of claim 5, wherein the partial-spherical casings comprise a first partial-spherical casing and a second partial-spherical casing, the first partial spherical casing lager than the second partial spherical casing, the interfacing portions of the first and the second partial-spherical casings are formed with teeth and slots which are engaged with each other, the supporting bars are mounted to the first partial-spherical casing, and the second partial-spherical casing is fixedly connected with the first partial-spherical casing by a screw.

7. The ultra lightweight clamp for three coordinate measuring of claim 4, wherein the partial-spherical casings comprise a first partial-spherical casing and a second first partial spherical casing, the first partial spherical casing larger than the second partial spherical casing, the interfacing portions of the first and the second partial-spherical casings are formed with teeth and slots which are engaged with each other, the supporting bars are mounted to the first partial-spherical casing, and the second partial-spherical casing is fixedly connected with the first partial-spherical casing by a screw.

8. The ultra lightweight clamp for three coordinate measuring of claim 3, wherein each of the joints is formed by two partial-spherical hollow casings, the supporting bars further comprise swingable supporting bars, and opposite ends of each swingable supporting bar are each provided with a connection sleeve with an internal screw thread, with one or both ends of the swingable supporting bar being connected with corresponding joints via swingable couplers; and wherein each swingable coupler comprises a pair of socket part and ball head which are mating with each other, and opposite ends of the swingable coupler are provided respectively with a screw bar engaged with the connection sleeve and a screw hole engaged with a screw which extends out from the joint.

9. The ultra lightweight clamp for three coordinate measuring of claim 8, wherein the socket part is formed by assembling a socket bar, a connection seat and an outer sleeve in sequence, the socket bar is formed with an outer screw thread to form the screw bar, a screw nut is engaged around the screw bar, the connection seat and the outer sleeve are adjoined with each other to form an internal spherical surface therein for accommodating the ball head, and an end of the ball head is provided with a base in which a screw hole is formed.

10. The ultra lightweight clamp for three coordinate measuring of claim 9, wherein the partial-spherical casings comprise a first partial-spherical casing and a second partial-spherical casing, the first partial spherical casing lager than the second partial spherical casing, the interfacing portions of the first and the second partial-spherical casings are formed with teeth and slots which are engaged with each other, the supporting bars are mounted to the first partial-spherical casing, and the second partial-spherical casing is fixedly connected with the first partial-spherical casing by a screw.

11. The ultra lightweight clamp for three coordinate measuring of claim 3, wherein the support assembly comprises one or two layers of said pyramidal spatial frameworks, and the supporting bars each have a diameter of 15-25 mm.

12. The ultra lightweight clamp for three coordinate measuring of claim 8, wherein the partial-spherical casings comprise a first partial-spherical casing and a second partial-spherical casing, the first partial spherical casing lager than the second partial spherical casing, the interfacing portions of the first and the second partial-spherical casings are formed with teeth and slots which are engaged with each other, the supporting bars are mounted to the first partial-spherical casing, and the second partial-spherical casing is fixedly connected with the first partial-spherical casing by a screw.

13. The ultra lightweight clamp for three coordinate measuring of claim 1, wherein the feet and the joints are all formed of aluminum alloy, the feet comprise at least three feet, each foot is located at the bottom of a corresponding joint by means of a pin and fixed thereto by a screw, the support assembly comprises roller wheels at a longitudinal end of it, the roller wheels are mounted respectively to corresponding joints on opposite sides of the end of the support assembly, the roller wheels are on the outside of the feet in the longitudinal direction of the support assembly, and the bottom edges of the roller wheels are higher than the bottom surfaces of the feet in the height direction of support assembly.

\* \* \* \* \*

UNITED STATES PATENT AND TRADEMARK OFFICE
CERTIFICATE OF CORRECTION

PATENT NO. : 9,752,720 B2
APPLICATION NO. : 15/041787
DATED : September 5, 2017
INVENTOR(S) : Chrisolof Schyttberg It is certified that error appears in the above-identified patent and that said Letters Patent is hereby corrected as shown below:

In the Claims

Column 8 (Line 37) Claim 7, Line 3, delete "first"

Signed and Sealed this
Thirty-first Day of October, 2017

Joseph Matal
*Performing the Functions and Duties of the
Under Secretary of Commerce for Intellectual Property and
Director of the United States Patent and Trademark Office*